(12) United States Patent
Steinwender

(10) Patent No.: US 7,785,221 B2
(45) Date of Patent: Aug. 31, 2010

(54) TRANSMISSION UNIT FOR A MOTOR VEHICLE AND CONTROL METHOD THEREFOR

(75) Inventor: Herbert Steinwender, Raaba (AT)

(73) Assignee: Magna Powertrain AG & Co KG, Lannach (AT)

( * ) Notice: Subject to any disclaimer, the term of this patent is extended or adjusted under 35 U.S.C. 154(b) by 731 days.

(21) Appl. No.: 11/818,262

(22) Filed: Jun. 13, 2007

(65) Prior Publication Data

US 2008/0009379 A1 Jan. 10, 2008

(30) Foreign Application Priority Data

Jun. 14, 2006 (DE) .................. 10 2006 027 709

(51) Int. Cl.
*F16H 3/72* (2006.01)

(52) U.S. Cl. .......................... 475/5; 475/218

(58) Field of Classification Search ............ 475/5, 475/149, 151, 311, 329, 900; 477/4
See application file for complete search history.

(56) References Cited

U.S. PATENT DOCUMENTS

| 6,159,127 | A | 12/2000 | Loeffler et al. |
| 6,332,257 | B1 * | 12/2001 | Reed et al. ................. 29/401.1 |
| 6,394,924 | B1 | 5/2002 | Schiebold et al. |
| 6,645,105 | B2 | 11/2003 | Kima |
| 2006/0100056 | A1 * | 5/2006 | Yamauchi ....................... 477/3 |

FOREIGN PATENT DOCUMENTS

| DE | 19901414 | 7/2000 |
| EP | 0845618 | 6/1998 |
| JP | 6203540 | 2/1987 |
| JP | 2004210116 | 7/2004 |
| WO | WO99/50572 | 10/1999 |

* cited by examiner

*Primary Examiner*—Sherry L Estremsky
*Assistant Examiner*—Edwin A. Young
(74) *Attorney, Agent, or Firm*—Harness, Dickey & Pierce, P.L.C.

(57) ABSTRACT

A transmission unit for a motor vehicle has a drive shaft for a connection to an internal combustion engine of the motor vehicle, an output shaft for the driving of the motor vehicle, a change speed gearbox, an additional drive motor and a planetary transmission, with the additional drive motor being coupled to a first part of the planetary transmission and the output shaft being coupled to a second part of the planetary transmission. The change speed gearbox has at least one selectable gear stage via which the drive shaft of the transmission unit can be operationally coupled directly to the output shaft while bypassing the planetary transmission. The change speed gearbox furthermore has at least one second selectable gear stage via which the drive shaft can be operationally coupled indirectly to the output shaft via a third part of the planetary transmission.

22 Claims, 7 Drawing Sheets

Figure 1A:
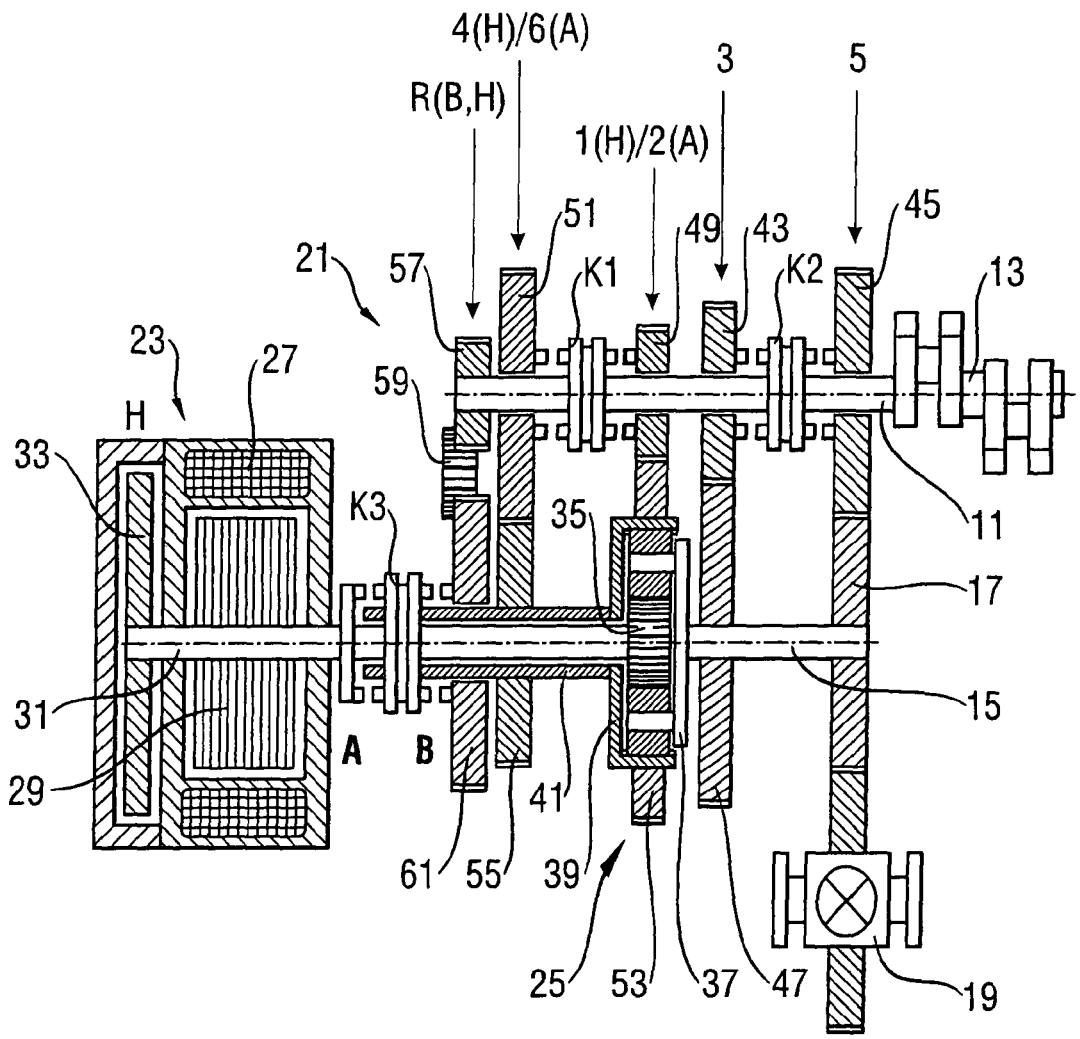

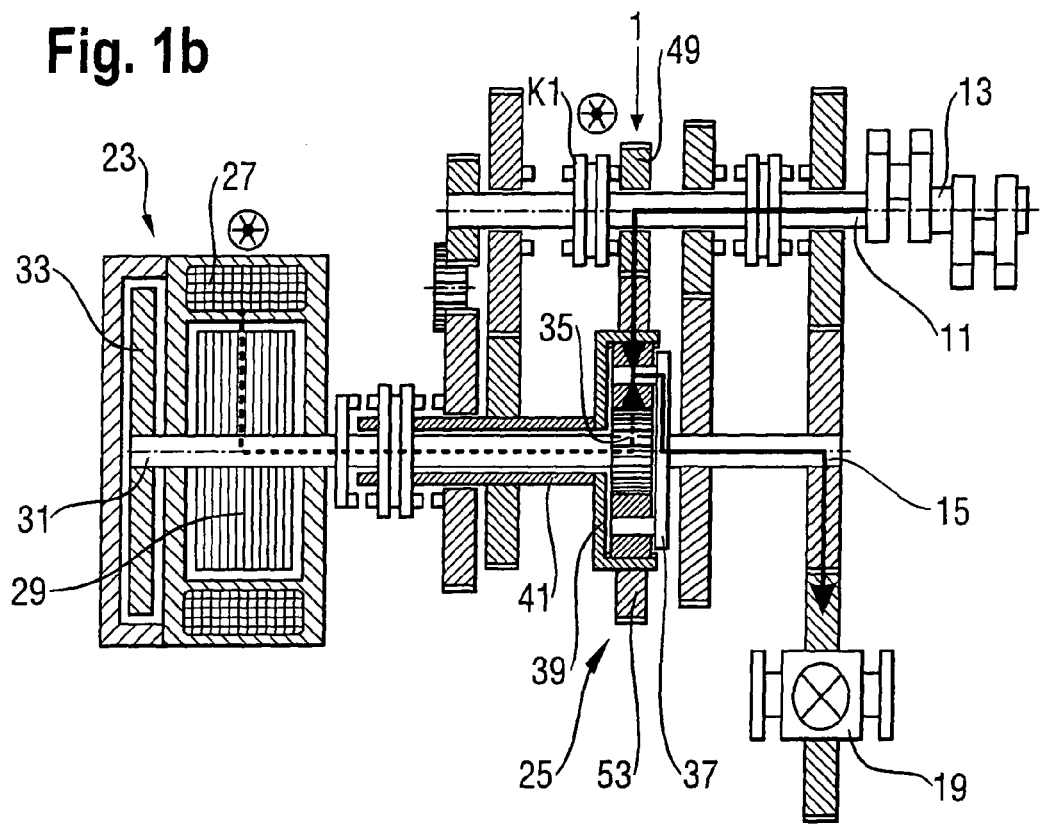
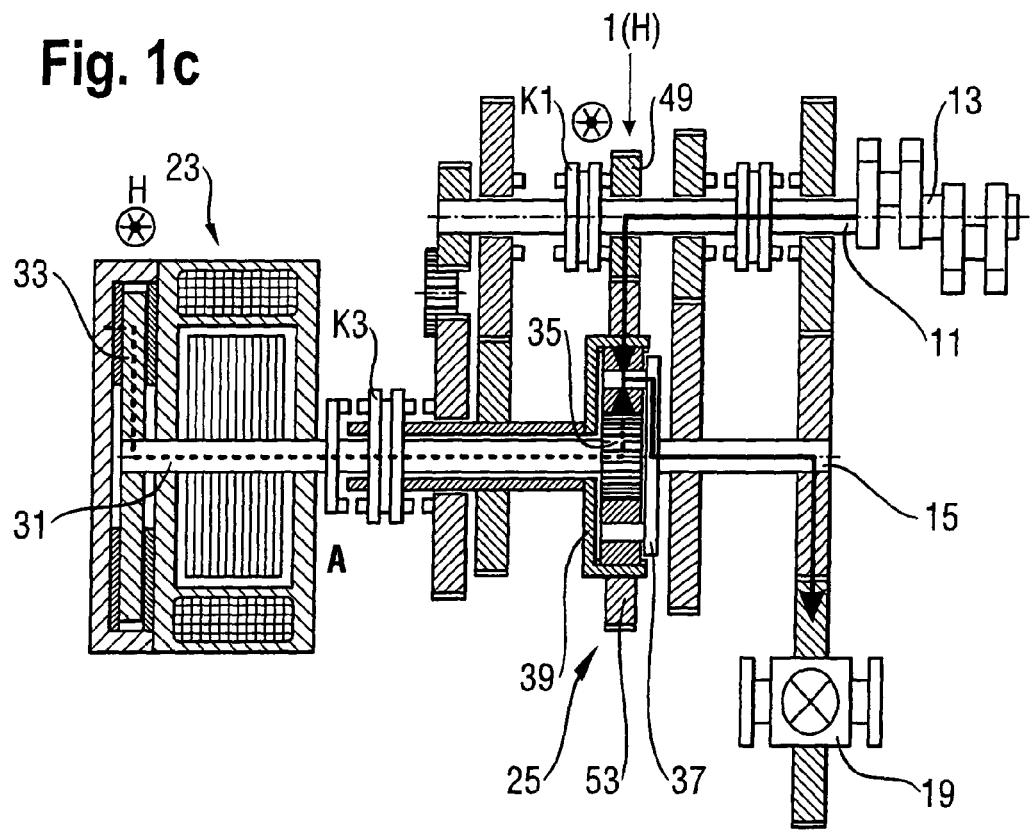

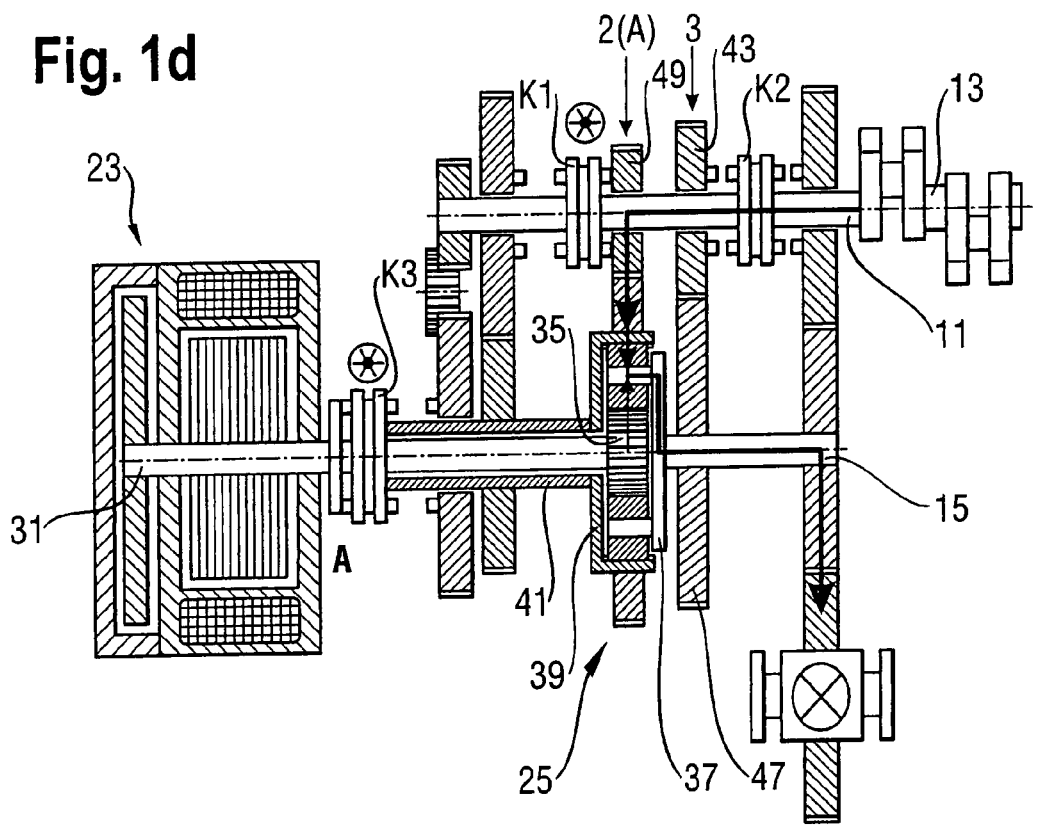
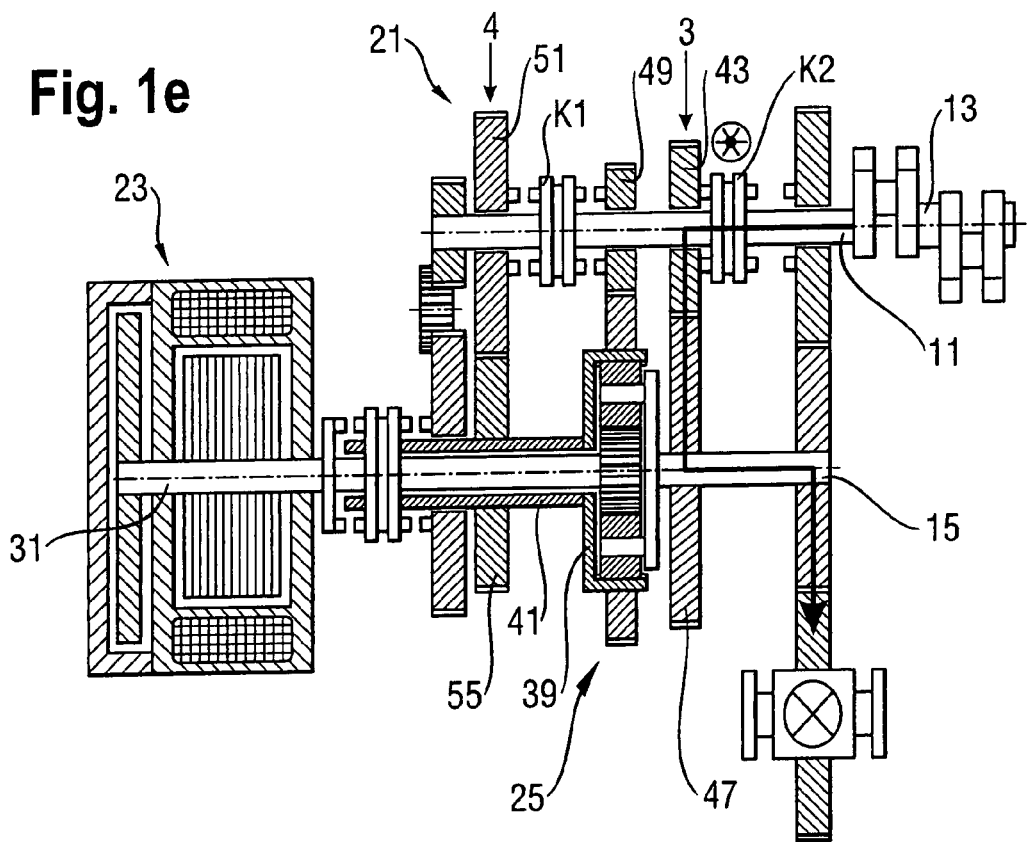

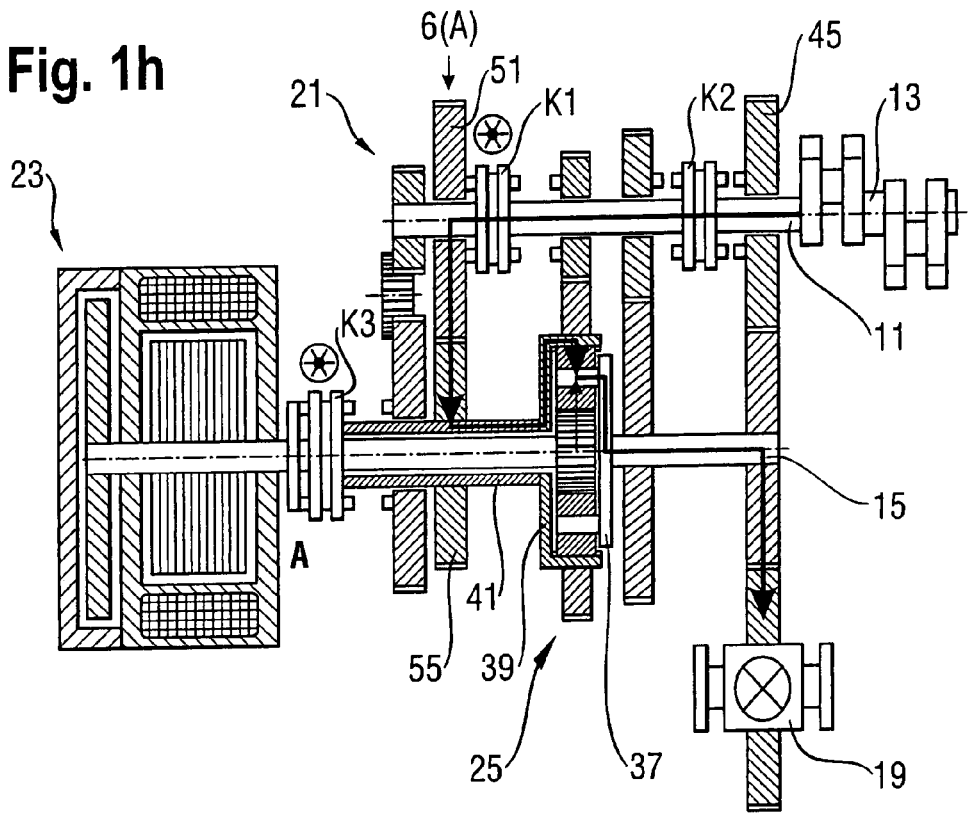
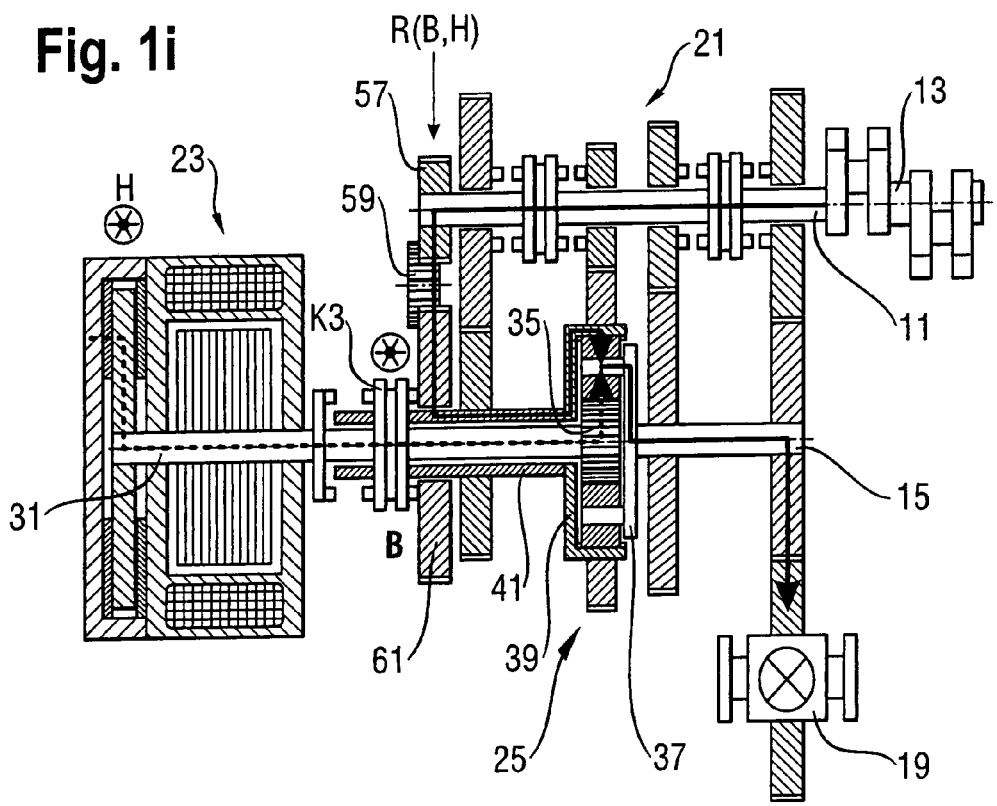

TRANSMISSION UNIT FOR A MOTOR VEHICLE AND CONTROL METHOD THEREFOR

The invention relates to a transmission unit for a motor vehicle, wherein a drive shaft is provided for a connection of the transmission unit to an internal combustion engine and an output shaft is provided for the driving of the motor vehicle. The transmission unit furthermore has a change speed gearbox having a plurality of selectable gear stages, an additional drive motor (e.g. an electric motor) and a planetary transmission which has a plurality of parts such as a sun gear, a planetary carrier and an annulus gear. The additional drive motor is coupled to a first part of the planetary transmission and the output shaft of the transmission unit is coupled to a second part of the planetary transmission so that a driving torque of the additional drive motor can be transmitted to the output shaft via the planetary transmission.

Transmission units of this type are known in different embodiments for a hybrid drive of motor vehicles. They have in common that the additional drive motor can support the internal combustion engine of the motor vehicle, or can even completely replace it at times, with respect to the driving torque to be generated. The higher the driving torque to be generated by the additional drive motor for this purpose, the larger the additional drive motor and the associated energy store must be dimensioned. The arrangement can hereby reach a disadvantage constructional size and can be undesirably expensive.

A further problem of known transmission units having a plurality of selectable gear stages comprises an undesirable interruption of traction being noticeable during a change of the selected gear stage. To the extent that the additional drive motor is utilized to replace the lack of driving torque of the internal combustion engine during a change of gear, the additional drive motor must in turn be dimensioned undesirably large in known arrangements.

It is an object of the invention to provide a transmission unit having a plurality of selectable gear stages which permits a change of a gear stage without any interruption of traction, with the additional drive motor of the transmission unit being able to be manufactured cost-effectively, to have a small constructional size and low energy requirements. Furthermore, a corresponding control method for a transmission unit of a motor vehicle should be provided.

This object is satisfied in accordance with a first aspect of the invention by a transmission unit having the features of claim 1 and in particular in that the change speed gearbox has at least one first selectable gear stage via which the drive shaft of the transmission unit can be operationally coupled directly to the output shaft while bypassing the planetary transmission and in that the change speed gearbox has at least a second selectable gear stage via which the drive shaft can be operationally coupled indirectly to the output shaft via a third part of the planetary transmission.

The change speed gearbox of the transmission unit therefore has different gear stages via which the drive shaft of the transmission unit can be operationally coupled to the output shaft of the transmission unit selectively directly—that is while bypassing the planetary transmission—or indirectly—that is via the planetary transmission. A predetermined transmission ratio, in particular a speed reducing ratio, is associated with each gear stage. An operational coupling is to be understood in this connection as a rotationally effective drive connection for the transmission of a driving torque from the drive shaft to the output shaft.

The drive shaft of the transmission unit can be simultaneously coupled to the output shaft during a change in the selected gear stage via a plurality of gear stages by such an embodiment of the transmission unit with a selectively different power flow outside of or along the planetary transmission, with a torque being able to be transmitted to the output shaft of the transmission unit by means of the internal combustion engine and simultaneously by means of the additional drive motor (via the planetary transmission). The planetary transmission thus serves as a summarizing transmission which also allows a summarizing of a driving torque of the internal combustion engine and of a driving torque of the additional drive motor on a gear change.

An interruption of traction can hereby be at least partly compensated on a gear change, with the additional drive motor, however, not having to generate the total required driving torque during the gear change, but only superimposes a supplementary torque on the driving torque of the internal combustion engine also transmitted during the gear change. The additional drive motor used can thus be configured for a correspondingly low driving torque with such a transmission unit. The required constructional size and the manufacturing effort for the additional drive motor and the associated energy memory reduce accordingly.

The said first gear stage and the said second gear stage do not necessarily correspond to the lowest and second lowest gear stages of the change speed gearbox, but these terms are rather used here to distinguish between a gear stage for a direct coupling and a gear stage for an indirect coupling with the output shaft.

The invention can also be realized with any other summarizing transmission instead of the named planetary transmission.

The transmission unit can be formed as an automatic transmission or as a manually actuated stick transmission.

The additional drive motor can be an electric motor (e.g. E-motor) or a hydraulic motor (e.g. hydromotor, hydropump).

It is preferred for the output shaft of the transmission unit to be drive-effectively coupled to a planetary carrier of the planetary transmission, either with the additional drive motor being coupled to a sun gear of the planetary transmission and the drive shaft being able to be coupled to an annulus gear of the planetary transmission (via the said second gear stage) or with the additional drive motor being coupled to an annulus gear of the planetary transmission and the drive shaft being able to be coupled to a sun gear of the planetary transmission. In this configuration, the planetary transmission namely acts as summarizing transmission which also allows a superimposition of an additional (positive) driving torque of the additional drive motor onto the driving torque of the internal combustion engine on a gear change. The additional drive motor can hereby thus also transmit a supporting driving torque to the output shaft during a gear change in order to at least partly compensate an interruption of traction, while a driving torque is simultaneously transmitted from the internal combustion engine to the output shaft.

The said first selectable gear stage for the explained direct coupling of the drive shaft to the output shaft is preferably formed by a toothed wheel pair. The named second selectable gear stage for the indirect coupling of the drive shaft to the output shaft likewise preferably has a toothed wheel pair which can be coupled, on the one hand, directly to the drive shaft of the transmission unit and, on the other hand, to the named third part of the planetary transmission.

It is not absolutely necessary that a (first) gear stage having the explained direct coupling and a (second) gear stage having the explained indirect coupling between the drive shaft and the output shaft are involved for every gear change of the transmission unit. It is rather the case that additional gear stages can in particular be formed by utilizing the planetary transmission so that ultimately fewer toothed wheel ratios are required to represent a desired number of different gear stages.

For example, a clutch, by means of which a part of the planetary transmission (e.g. the annulus gear or the sun gear) can be blocked fixedly to the housing, can be associated with at least one selectable gear stage of the change speed gearbox.

Alternatively or additionally, a clutch, by means of which a part of the planetary transmission can be rotationally fixedly coupled to another part of the planetary transmission, for example in that the annulus gear and the sun gear of the planetary transmission are blocked, can be associated with at least one selectable gear stage of the change speed gearbox. The additional drive motor can hereby also drive the output shaft of the transmission unit independently of the internal combustion engine.

It is furthermore preferred for the additional drive motor to be arranged coaxially to a lay shaft of the change speed gearbox and/or for a drive shaft of the additional drive motor to serve as a lay shaft. A particularly simple design hereby results with a low constructional size of the transmission unit and a low number of required toothed wheels.

It is furthermore of advantage for a brake to be associated with a drive shaft of the additional drive motor, said shaft being able to be selectively blocked by means of said brake. An additional gear stage can ultimately be formed hereby. Furthermore, a brake of this type can serve as a starting clutch or a brake of this type serves as a starting device together with the additional drive motor. Alternatively to this, however, it is also possible for the additional drive motor to be used alone as the starting device.

Finally, the transmission unit can have a control device by means of which the change speed gearbox and the additional drive motor can be controlled such that the drive shaft is simultaneously coupled to the output shaft via a plurality of gear stages during a gear shift and, in this process, a torque of the additional drive motor is additionally transmitted to the output shaft via the planetary transmission.

The initially explained object is satisfied in accordance with a second aspect of the invention by a transmission unit having the features of claim 14 and in particular in that the output shaft of the transmission unit is operationally coupled to a planetary carrier of the planetary transmission, with the additional drive motor being coupled to a sun gear of the planetary transmission and the drive shaft being able to be coupled to an annulus gear of the planetary transmission—or vice versa.

As already explained, it is hereby possible to use the planetary transmission as a summarizing transmission which also permits a superimposition of an additional (positive) driving torque of the additional drive motor onto the driving torque of the internal combustion engine on a gear change. The additional drive motor can hereby thus transmit a supporting driving torque to the output shaft during a gear change in order to at least partly compensate an interruption of traction, while a driving torque is simultaneously transmitted from the internal combustion engine to the output shaft.

The advantages and further developments of the first aspect of the invention named above and in the dependent claims (gear stage for direct coupling and gear stage for indirect coupling to the output shaft) also apply to this second invention aspect so that an explicit repetition is omitted.

The invention further relates to a method for the control of a transmission unit of the explained type, wherein, for at least one gear change, a previously selected gear stage of the change speed gearbox is only released when a gear stage to be selected next has likewise already been selected, with the respective one gear stage establishing a direct connection of the drive shaft to the output shaft of the transmission unit and the respective other gear stage establishing an indirect connection of the drive shaft to the output shaft via the planetary transmission—or vice versa.

In addition, the invention relates to a method for the control of a transmission unit of the already explained type, wherein, for at least one gear change, a previously selected gear stage is only released when a gear stage to be selected next has likewise already been selected, with at least some of the driving torque of the internal combustion engine being transmitted to the planetary transmission via the change speed gearbox and a torque of the additional drive motor additionally being transmitted to the planetary transmission during the gear change, and with a summarized torque of the internal combustion engine and of the additional drive motor being transmitted to the output shaft of the transmission unit via the planetary transmission during the gear change.

At least some of the driving torque of the internal combustion engine can also be transmitted via the change speed gearbox to the planetary transmission during the whole period of a gear change by control methods of this type and, additionally, a torque of the additional drive motor can be transmitted to the planetary transmission or can be superimposed on the driving torque of the internal combustion engine, with the summarized torque of the internal combustion engine and of the additional drive motor being transmitted to the output shaft of the transmission unit by means of the planetary transmission. An interruption of traction can thus be at least partly compensated during a gear change, with the additional drive motor not having to generate the whole driving torque required at the output shaft.

It also applies to control methods of this type that it is not absolutely necessary to alternate between the named direct connection and the named indirect connection between the drive shaft and the output shaft for every gear change.

Further embodiments of the invention are set forth in the dependent claims.

The invention will be described in the following only by way of example with reference to the drawings.

Figure 1F:
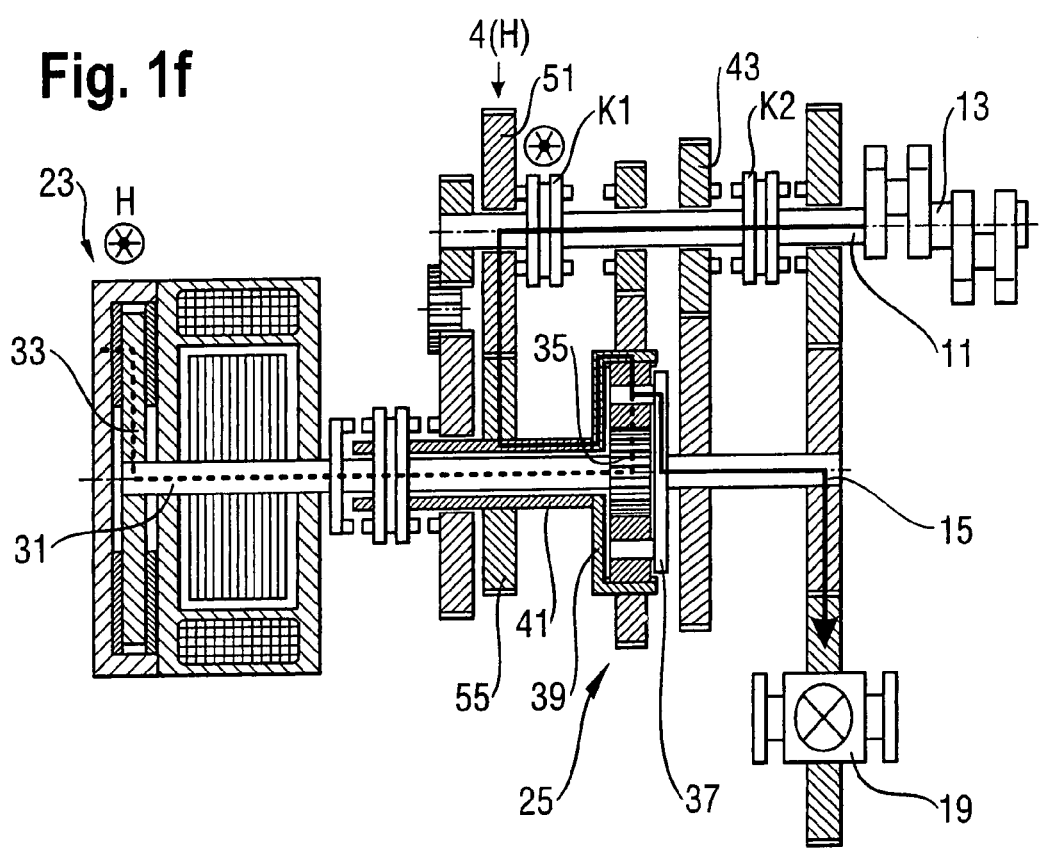
Figure 1G:
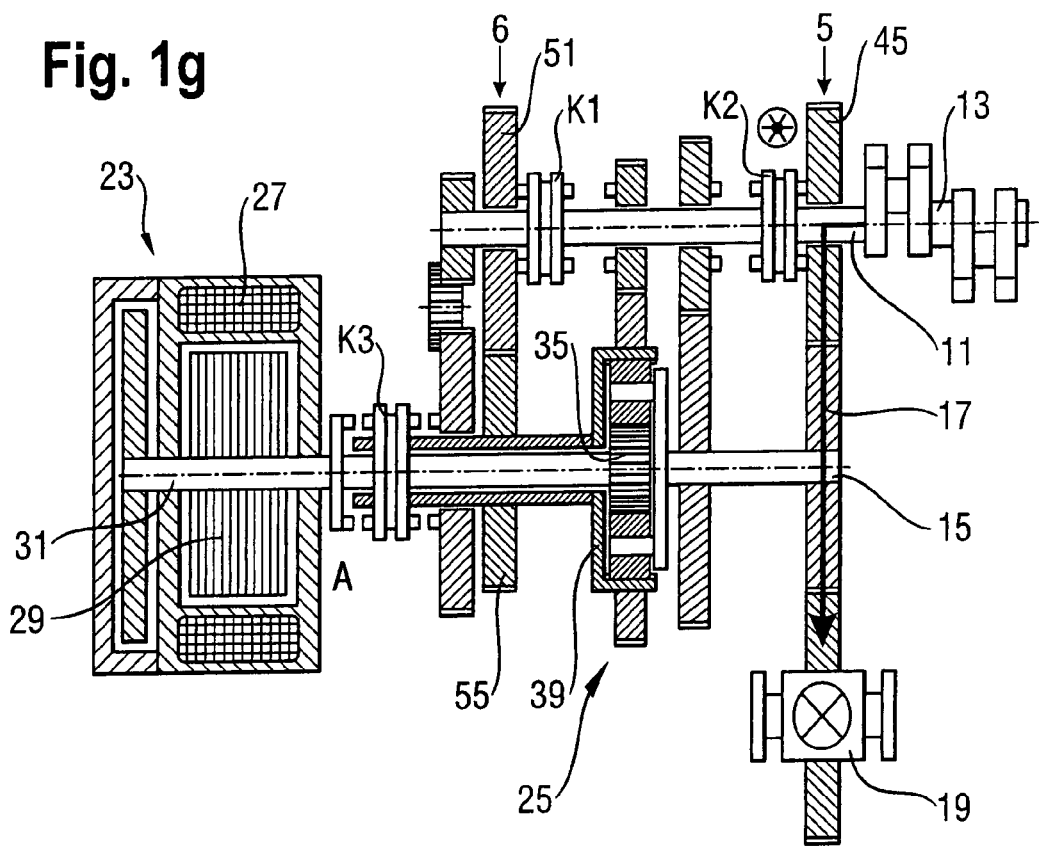
Figure 1J:
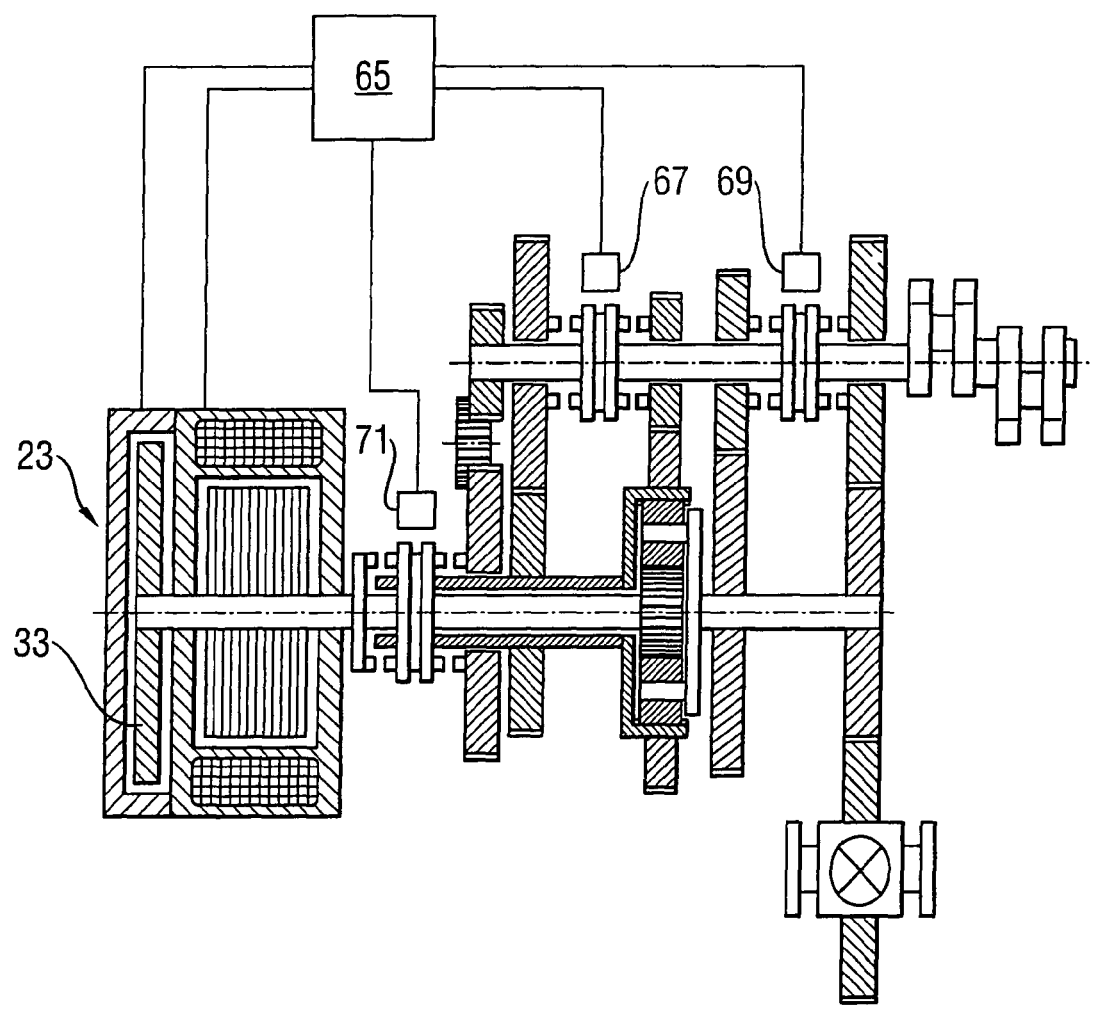
Figure 2:
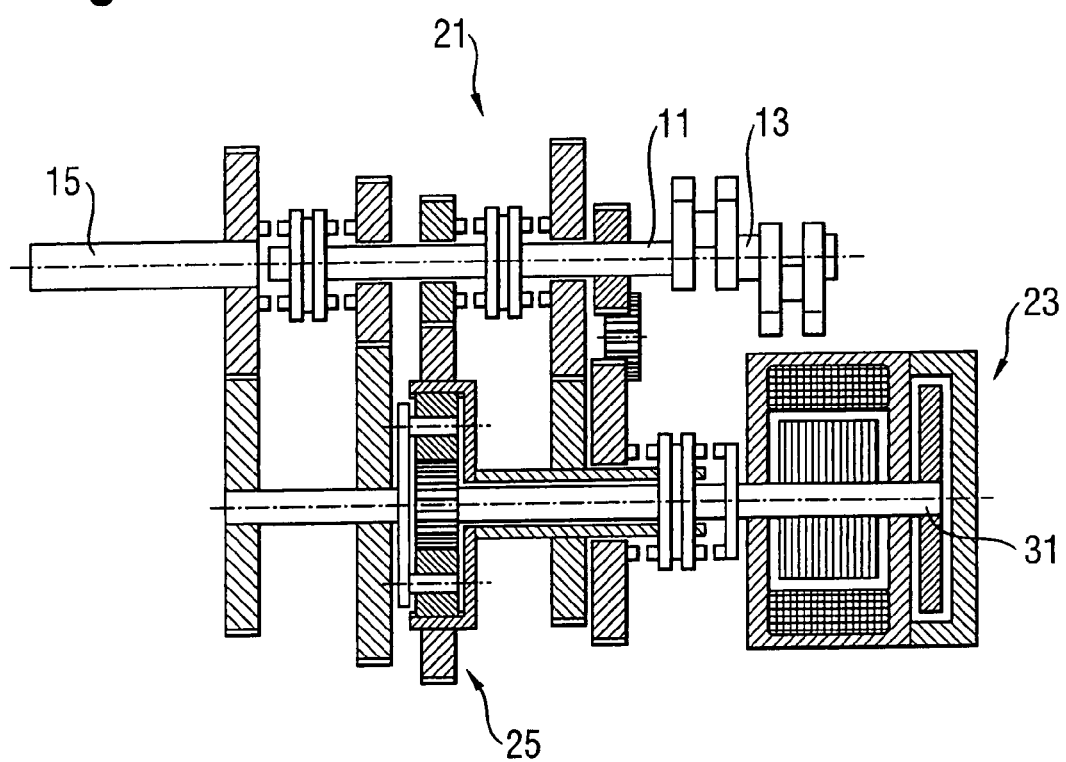

FIG. 1*a* shows an embodiment of a transmission unit for a transverse engine arrangement;

FIGS. 1*b* to 1*i* show the transmission unit in accordance with FIG. 1*a* when starting and with different selected gear stages;

FIG. 1*j* shows the embodiment in accordance with FIG. 1*a* with an associated control device;

FIG. 2 shows an embodiment of a transmission unit for a longitudinal engine arrangement.

FIG. 1*a* shows an exemplary embodiment of a transmission unit for a motor vehicle. It has a drive shaft 11 which is rotationally effectively connected to an internal combustion engine—symbolized here by a crankshaft 13. The transmission unit shown furthermore has an output shaft 15 which is coupled via a toothed wheel 17 rotationally fixedly connected thereto to an axle differential 19 to hereby drive the motor vehicle.

The transmission unit furthermore has a change speed gearbox 21 which will be explained in more detail in the following as well as an electric motor 23 and a planetary transmission 25. The electric motor 23 has a stator 27 which is arranged fixed with respect to the housing and a rotor 29 which can be driven to make a rotary movement. The rotor 29 is rigidly connected to a motor shaft 31 which in turn cooperates with a brake 33.

The motor shaft 31 is furthermore rigidly coupled to a sun gear 35 of the planetary transmission 25. A planetary carrier 37 of the planetary transmission 25 is rigidly coupled to the already named output shaft 15 of the transmission unit. An annulus gear 39 of the planetary transmission 25 is connected to a hollow shaft 41 which surrounds the motor shaft 31.

The named change speed gearbox 21 has a plurality of selectable gear stages 1/2, 3, 4/6, 5 R as well as a plurality of clutches K1, K2, K3. The shift ratios 3 and 5 each have an idler 43 and 45 which is seated on the drive shaft 11 and meshes with a toothed wheel 47 of the output shaft 15 or with the already named toothed wheel 17. The gear stages 1/2 and 4/6 each have an idler 49 and 51 which is seated on the drive shaft 11 and meshes with a toothed wheel 53 rigidly connected to the annulus gear 39 or with a toothed wheel 55 rigidly connected to the hollow shaft 41. The gear stage R has a toothed wheel 57 rigidly connected to the drive shaft 11 and rotationally effectively connected via an additional toothed wheel 59 to an idler 61 seated on the hollow shaft 41 for a reversal of the direction of rotation.

The clutches K1, K2 and K3 are made as shape matched clutches (e.g. dog clutches). The clutches K1 and K2 are seated rotationally fixedly, but displaceably, on the drive shaft 11. The clutch K3 is seated rotationally fixedly, but displaceably, on the hollow shaft 41. Starting from a neutral position shown in FIG. 1a, the clutch K3 is displaceable between a position A and a position B.

It is indicated in brackets in FIG. 1a for the gear stages 1/2, 4/6 and R for which position of the clutch K3 (A or B) the respective gear stage is activated or whether an activation of the brake 33 is necessary ("H") to select the respective gear stage.

The output shaft 15 of the transmission unit simultaneously forms a lay shaft of the change speed gearbox 21 since said output shaft is rigidly coupled to the toothed wheels 47 and 17 of the gear stage 3 or 5 respectively. The hollow shaft 41 associated with the motor shaft 31 likewise forms a lay shaft of the transmission unit with respect to the gear stages 1/2, 4/6 and R. The motor shaft 31 of the electric motor 23 is arranged coaxially to these lay shafts.

The transmission unit shown in FIG. 1a is characterized in that a driving torque of the internal combustion engine transmitted via the crankshaft 13 onto the drive shaft 11, on the one hand, and a driving torque generated by the electric motor 23, on the other hand, can be summarized in the planetary transmission and can be transmitted as mutually superimposed driving torque onto the output shaft 15 or onto the axle differential 19. The output shaft 15 is coupled to the planetary carrier 37 of the planetary transmission 25 for this purpose.

The transmission unit shown is furthermore characterized in that the change speed gearbox 21 has a plurality of gear stages 3, 5 via which the drive shaft 11 can be operationally coupled directly to the output shaft 15 and in that the change speed gearbox 21 furthermore has a plurality of gear stages 1/2, 4/6 via which the drive shaft 11 can be operationally coupled indirectly—namely via the planetary transmission 25—to the output shaft 15. The driving torque of the internal combustion engine can be conducted by this configuration simultaneously at times via a plurality of the gear stages 1/2, 3, 4/6, 5—i.e. in accordance with different power flows—to the output shaft 15 during a change of the selected gear stage, while an additional torque is generated by the electric motor 23.

A gear change is hereby possible without any substantial interruption of traction, with the electric motor 23 always only having to generate a portion of the driving torque required at the output shaft 15. The electric motor 23 therefore does not have to generate the total driving torque of the internal combustion engine and it can be configured for a correspondingly lower torque capacity.

Additional gear stages 2, 6 can be presented in that the annulus gear 39 can be blocked with the sun gear 35 of the planetary transmission 25 by means of the clutch K3 in the position A, without further toothed gear pairs being required for this purpose.

The electric motor 23 can also work in as a generator as will be explained in the following. The electrical energy gained in this process can be utilized for a subsequent motor operation of the electric motor 23. For this purpose, the electric motor 23 can be connected to an electric memory (not shown), for example to high capacity capacitors (so-called supercaps).

In the following, the operation of the transmission unit in accordance with FIG. 1a will be explained in more detail with reference to FIGS. 1b to 1i, with the respectively activated member of the transmission unit (clutch, electric motor, brake) being indicated by an asterisk.

FIG. 1b shows the starting of the motor vehicle.

The clutch K1 cooperates with the idler 49 so that the gear stage 1 is already selected and a driving torque of the internal combustion engine is transmitted to the toothed wheel 53 and the annulus gear 39 of the planetary transmission 25 via the drive shaft 11 and the named idler 49. As long as the vehicle brake is actuated (output shaft 15 stationary), the internal combustion engine thus effects a rotation of the sun gear 35 of the planetary transmission 25 and hereby a rotation of the motor shaft 31 and of the rotor 29 of the electric motor 23. The energy of the internal combustion engine generated when the vehicle is stationary can thus be gained and stored in a generational manner in the electric motor 23. The vehicle wheels must be braked in this process to prevent an unwanted starting.

After the vehicle brake (not shown) has been released, the rotor 29 of the electric motor 23 is increasingly braked in a generational manner by a corresponding control of the stator 27 so that an increasing driving torque is transmitted to the output shaft 15 and to the axle differential 19 via the planetary carrier 37 of the planetary transmission 25. This generational braking can optionally be assisted by actuation of the brake 33; the respective constructional size of the electric motor 23 and of the electric memory used is hereby reduced.

As soon as the complete standstill of the rotor 29 has been achieved in this manner, the motor shaft 31 is blocked by means of the brake 33 so that the electric motor 23 no longer has to generate any support torque from this time onward.

FIG. 1c shows the state thus achieved.

The motor vehicle is now in driving operation with a selected gear stage 1, with the driving torque being completely generated by the internal combustion engine.

It must be noted that the starting has taken place without using a starting clutch connected between the crankshaft 13 and the shown transmission unit.

As soon as a predetermined minimum speed of the crankshaft 13 has now been reached, a change is made from gear stage 1 to gear stage 2. For this purpose—while the clutch K1 remains coupled to the idler 49—the brake 33 associated with the motor shaft 31 is released and, while the speed of the drive shaft 11 of the transmission unit is reduced by a corresponding control of the internal combustion engine, the electric motor 23 drives the motor shaft 31 and thus the sun gear 35 of the planetary transmission 25 such that the speed of the output shaft 15 coupled to the planetary carrier 37 and the driving torque transmitted in total onto the output shaft 15 via the planetary transmission 25 are substantially maintained. As soon as the motor shaft 31 and the hollow shaft 41 rigidly connected to the annulus gear 39 hereby reach a synchronous speed, the clutch K3 is brought into the position A so that the annulus gear 39 and the sun gear 35 of the planetary transmission 25 are rotationally fixedly connected to one another. The gear stage 2 is now selected and the driving torque transmitted to the output shaft 15 is generated completely via the crankshaft 13 of the internal combustion engine.

FIG. 1d shows the state thus achieved.

On an enduring acceleration of the motor vehicle—as soon as the drive shaft 11 again reaches a predetermined minimum speed—the motor shaft 31 of the electric motor 23 is again brought to a synchronous speed with the hollow shaft 41 so that the clutch K3 is made free of torque and can be opened. The clutch K1 initially remains coupled to the idler 49. The speed of the drive shaft 11 can now be reduced, with the missing driving torque at the output shaft 15 being compensated by the electric motor 23. During the lowering of the speed of the internal combustion engine, the remaining driving torque of the internal combustion engine and the supplementary driving torque now generated by the electric motor 23 are therefore summarized by means of the planetary transmission 25 such that substantially no interruption of traction is noticeable at the output shaft 15.

As soon as the speed of the drive shaft 11 coincides with the speed of the idler 43 rotationally effectively coupled to the toothed wheel 47 in this manner, the clutch K2 is coupled to the idler 43 to hereby establish a direct drive connection between the drive shaft 11 and the output shaft 15. The gear stage 3 is now selected. Only now, after the idler 49 and the clutch K1 have been made free of torque by a corresponding control of the electric motor, is the clutch K1 released from the idler 49.

FIG. 1e shows the state thus achieved.

The transmission of the drive torque from the drive shaft 11 to the output shaft 15 now takes place without the involvement of the electric motor 23 and of the planetary transmission 25. On the next gear stage of the change speed gearbox 21 to be selected, the driving torque of the internal combustion engine or of the crankshaft 13 is again conducted indirectly—namely via the planetary transmission 25—to the output shaft 15.

As soon as the drive shaft 11 again reaches a predetermined minimum speed, the idler 51 of the drive shaft 11 is synchronized (via the annulus gear 39, the hollow shaft 41 and the toothed wheel 55) with the drive shaft 11 by a corresponding control of the electric motor 23 and then the clutch K1 is coupled to the idler 51. The gear stage 3 and the gear stage 4 are now selected simultaneously at times. Some of the driving torque of the internal combustion engine is thus transmitted to the output shaft 15 directly via the gear stage 3 (idler 43 and toothed wheel 47) and some further driving torque of the internal combustion engine is transmitted to the annulus gear 39 of the planetary transmission 25 via the simultaneously selected gear stage 4 (idler 51, toothed wheel 55), with a torque of the electric motor 23 additionally being transmitted to the sun gear 35 of the planetary transmission 25. The planetary transmission 25 transmits the sum of these driving torques to the output shaft 15.

Now, the previously selected gear stage 3 is made free of torque by the corresponding control of the electric motor 23, i.e. the electric machine 23 now takes over the portion of the driving torque last transmitted via the gear stage 3 and the clutch K2 is released from the idler 43. The speed of the crankshaft 13 or of the drive shaft 11 is now reduced, whereas the speed of the motor shaft 31 of the electric motor 23 is simultaneously reduced until finally the motor shaft 31 is completely braked and is held by the brake 33. After a thus terminated gear change, the total driving torque of the internal combustion engine is now transmitted to the output shaft 15 indirectly—namely via the annulus gear 39 and the planetary carrier 37 with a blocked sun gear 35 of the planetary transmission 25—via the gear stage 4 (idler 51 and toothed gear 55).

FIG. 1f shows the state thus achieved.

The next gear stage to be selected again effects a direct operational coupling of the drive shaft 11 to the output shaft 15, past the planetary transmission 25: as soon as the drive shaft 11 has reached a predetermined minimum speed by a corresponding control of the internal combustion engine, the brake 33 associated with the electric motor 23 is released. While now the speed of the internal combustion engine and/or of the drive shaft 11 is lowered, the electric motor 23 generates an additional driving torque to prevent an interruption of traction at the output shaft 15. For this purpose, the driving torque of the internal combustion engine transmitted by the still selected gear stage 4 and the additional driving torque of the electric gear 23 are summarized by means of the planetary transmission 25.

As soon as the synchronous speed for the gear stage 5 has been reached, the clutch K2 effects a rotationally fixed coupling of the drive shaft 11 with the idler 45. The gear stage 5 is hereby selected. The clutch K1 can remain engaged with respect to the idler 51. A rotary movement of the motor shaft 31 with the rotor 29 resulting thereby can be utilized for an operation of the electric motor 23. as a generator FIG. 1g shows the state thus achieved.

An indirect coupling of the drive shaft 11 with the output shaft 15 via the planetary transmission 25 is again effected by the selection of the next gear stage. For this purpose such an additional driving torque is generated by means of the electric motor 23—while the clutch K1 is still coupled to the idler 51—said additional driving torque together with the driving torque of the internal combustion machine transmitted to the idler 51 via the drive shaft 11 (summarizing in planetary transmission 25) supporting or making free of torque the previously selected gear stage 5. The clutch K2 is now released from the idler 45.

The speed of the internal combustion engine or of the drive shaft 11 is then reduced, with the speed of the motor shaft 31 being adapted to the speed of the hollow shaft 41 by a corresponding control of the electric motor 23. As soon as a mutual synchronization has been reached, the clutch K3 is brought into the position A to rotationally fixedly couple the motor shaft 31 and the hollow shaft 41 to one another. The sun gear 35 and the annulus gear 39 of the planetary transmission 35 are thereby blocked and the driving torque acting on the output shaft 15 is generated solely by the internal combustion engine via the drive shaft 11 and the thus selected gear stage 6 (idler 51 and toothed wheel 55).

FIG. 1h shows the state thus achieved.

The shifting of the change speed gearbox 21 shown from a higher gear stage into a lower gear stage generally takes place in reverse order.

It can be seen from the above description of the respective change between different gear stages that the drive shaft 11 and thus the driving torque transmitted by the internal combustion engine are at no time completely uncoupled from the output shaft 15 of the transmission unit so that the electric motor 23 only has to provide a superimposition of an additional driving torque during a change of the selected gear stage of the change speed gearbox 21, with a summarization of the respective driving torques being effected by the planetary transmission 25.

It must further be noted that no mechanical synchronization means are required for the selection of the explained gear stages.

FIG. 1*i* shows the transmission unit with a selected reverse gear R for supplementary explanation. The clutch K3 is in the position B so that the driving torque of the internal combustion engine is transmitted to the hollow shaft 41 and to the annulus gear 39 of the planetary transmission 25 via the drive shaft 11, the toothed gear 57, the toothed gear 59 and the idler 61. Since the motor shaft 31 and thus the sun gear 35 of the planetary transmission 25 are blocked by means of the brake 33, the driving torque is conducted to the output shaft 15 via the planetary carrier 37. The starting in the reverse gear R takes place as explained in connection with FIG. 1*b*, that is by generational braking by means of the electric motor 23 and/or by braking by means of the brake 33.

FIG. 1*j* finally shows, for reasons of a better overview in a separate representation, a control device 65 for the control of the transmission unit in accordance with FIG. 1*a*. The control device is connected to the electric motor 23, to the brake 33 and furthermore (in a manner not shown) to the internal combustion engine. In addition, the control device 65 is connected to actuators 67, 69, 71 which serve for the actuation of the clutches K1, K2 or K3.

FIG. 2 illustrates that a comparable transmission unit as shown in FIGS. 1*a* to 1*j* can naturally also be realized for a longitudinal engine arrangement.

REFERENCE NUMERAL LIST 11 drive shaft
13 crankshaft
15 output shaft
17 toothed wheel
19 axle differential
21 change speed gearbox
23 electric motor
25 planetary transmission
27 stator
29 rotor
31 motor shaft
33 brake
35 sun gear
37 planet carrier
39 annulus gear
41 hollow shaft
43 idler
45 idler
47 toothed wheel
49 idler
51 idler
53 toothed wheel
55 toothed wheel
57 toothed wheel
59 toothed wheel
61 idler
65 control device
67 actuator
69 actuator
71 actuator
1 to 6 gear stage
R gear stage
K1, K2, K3 clutch
H activation state of the brake 33
A, B position of the clutch K3

The invention claimed is:

1. A transmission unit for a motor vehicle, comprising:
    a drive shaft (11) for a connection to an internal combustion engine of the motor vehicle;
    an output shaft (15) for the driving of the motor vehicle;
    a change speed gearbox (21);
    an additional drive motor (23); and
    a planetary transmission (25),
wherein the additional drive motor (23) is coupled to a first part (35) of the planetary transmission and the output shaft is coupled to a second part (37) of the planetary transmission, characterized in that
the change speed gearbox (21) has at least one first selectable gear stage (3, 5) via which the drive shaft (11) of the transmission unit can be operationally coupled directly to the output shaft (15) while bypassing the planetary transmission; and in that the change speed gearbox has at least one second selectable gear stage (1, 2, 4, 6) via which the drive shaft (11) can be operationally coupled indirectly to the output shaft (15) via a third part (39) of the planetary transmission.

2. A transmission unit in accordance with claim 1, characterized in that the output shaft (15) of the transmission unit is operationally coupled to a planetary carrier (37) of the planetary transmission, with the additional drive motor (23) being coupled to a sun gear (35) of the planetary transmission and the drive shaft (11) being able to be coupled to an annulus gear (39) of the planetary transmission—or vice versa—via the named second gear stage (1, 2, 4, 6).

3. A transmission unit in accordance with claim 1, characterized in that the drive shaft (11) can be simultaneously coupled to the output shaft (15) via the named first gear stage (3, 5) and the named second gear stage (2, 4, 6) during a gear change.

4. A transmission unit in accordance with claim 1, characterized in that a torque can be transmitted to the output shaft (15) by means of the additional drive motor (23) via the planetary transmission (25) when the drive shaft (11) is coupled to the output shaft (15) via a plurality of gear stages (3, 5, and 2, 4, 6) of the change speed gearbox (21) during a gear change.

5. A transmission unit in accordance with claim 1, characterized in that the named second gear stage (1, 2, 4, 6) of the change speed gearbox has a toothed wheel pair which can be couple to the drive shaft (11) of the transmission unit, on the one hand, and to the third part (39) of the planetary transmission, on the other hand.

6. A transmission unit in accordance with claim 1, characterized in that a clutch (33), by means of which the first part (35) or the third part (37) of the planetary transmission can be blocked in a manner fixed to the housing, is associated with at least one selectable gear stage (4).

7. A transmission unit in accordance with claim 6, characterized in that an annulus gear or a sun gear of the planetary transmission can be blocked by means of the clutch.

8. A transmission unit in accordance with claim 1, characterized in that a clutch (K3), by means of which the first part (35) of the planetary transmission can be rotationally fixedly coupled to the third part (39) of the planetary transmission, is associated with at least one selectable gear stage (2, 6) of the change speed gearbox.

9. A transmission unit in accordance with claim 8, characterized in that an annulus gear (39) of the planetary transmission can be rotationally fixedly coupled to a sun gear (35) of the planetary transmission by means of the clutch (K3).

10. A transmission unit in accordance with claim 1, characterized in that the additional drive motor (23) is arranged coaxially to a lay shaft (15) of the change speed gearbox; or in that a drive shaft (31) of the additional drive motor (23) serves as a lay shaft of the change speed gearbox.

11. A transmission unit in accordance with claim 1, characterized in that a brake (33), by means of which the drive shaft of the additional drive motor can be blocked, is associated with a drive shaft (31) of the additional drive motor (23).

12. A transmission unit in accordance with claim 1, characterized in that the transmission unit has a control device (65) by means of which the change speed gearbox (21) and the additional drive motor (23) can be controlled such that the drive shaft (11) is simultaneously coupled to the output shaft (15) via a plurality of gear stages of the change speed gearbox during a gear change.

13. A transmission unit in accordance with claim 1, characterized in that the additional drive motor is an electric motor (23) or a hydraulic motor.

14. A transmission unit for a motor vehicle, comprising:
a drive shaft (11) for a connection to an internal combustion engine of the motor vehicle;
an output shaft (15) for the driving of the motor vehicle;
a change speed gearbox (21);
an additional drive motor (23); and
a planetary transmission (25),
wherein the additional drive motor (23) is coupled to a first part (35) of the planetary transmission and the output shaft is coupled to a second part (37) of the planetary transmission, characterized in that
the output shaft (15) of the transmission unit is operationally coupled to a planetary carrier (37) of the planetary transmission, with the additional drive motor (23) being coupled to a sun gear (35) of the planetary transmission and the drive shaft being able to be coupled to an annulus gear (39) of the planetary transmission—or vice versa.

15. A method for the control of a transmission unit of a motor vehicle which has:
a drive shaft (11) connected to an internal combustion engine of the motor vehicle;
an output shaft (15) for the driving of the motor vehicle;
a change speed gearbox (21);
an additional drive motor (23); and
a planetary transmission (25),
wherein the additional drive motor (23) is coupled to a first part (35) of the planetary transmission and the output shaft is coupled to a second part (37) of the planetary transmission, characterized in that
a previously selected gear stage (2, 4, 6) of the change speed gearbox is only released for at least one gear change when a gear stage (3, 5) of the change speed gearbox to be selected next has likewise already been selected,
with the respective one gear stage (3, 5) establishing a direct connection of the drive shaft (11) of the transmission unit to the output shaft (15) and the respective other gear stage (2, 4, 6) establishing an indirect connection of the drive shaft (11) to the output shaft (15) via a third part (39) of the planetary transmission—or vice versa.

16. A method in accordance with claim 15, characterized in that at least some of the driving torque of the internal combustion engine is transmitted to the planetary transmission (25) via the change speed gearbox (21) during the gear change and a torque of the additional drive motor (23) is additionally transmitted to the planetary transmission (25), with a summarized torque of the internal combustion engine and of the additional drive motor being transmitted to the output shaft (15) of the transmission unit via the planetary transmission.

17. A method in accordance with claim 15, characterized in that the output shaft (15) of the transmission unit is operationally coupled to a planetary carrier (37) of the planetary transmission.

18. A method in accordance with claim 15, characterized in that the gear stage to be selected next for the gear change is synchronized by a corresponding control of the additional drive motor (23) before this gear stage is selected; and
in that the previously selected gear stage is made free of torque by a corresponding control of the additional drive motor (23) before said gear stage is selected.

19. A method in accordance with claim 15, characterized in that, after the releasing of a gear stage (3, 5) establishing a direct connection of the drive shaft to the output shaft, the speed of the drive shaft (11) is matched to the gear stage to be switched next.

20. A method in accordance with claim 15, characterized in that, before the releasing of a gear stage (1, 2, 4, 6) establishing an indirect connection of the drive shaft to the output shaft, the speed of the drive shaft (11) is matched to the gear stage to be switched next.

21. A method for the control of a transmission unit of a motor vehicle which has:
a drive shaft (11) connected to an internal combustion engine of the motor vehicle;
an output shaft (15) for the driving of the motor vehicle;
a change speed gearbox (21);
an additional drive motor (23); and
a planetary transmission (25),
characterized in that
previously selected gear stage (2, 4, 6) of the change speed gearbox is only released for at least one gear change when a gear stage (3, 5) of the change speed gearbox to be selected next has likewise already been selected, with at least some of the driving torque of the internal combustion engine being transmitted to the planetary transmission (25) via the change speed gearbox (21) during the gear change and a torque of the additional drive motor (23) additionally being transmitted to the planetary transmission (25) and with a summarized torque of the internal combustion engine and of the additional drive motor being transmitted to the output shaft (15) of the transmission unit via the planetary transmission during the gear change.

22. A method in accordance with claim 21, characterized in that the additional drive motor (23) is coupled to a first part (35) of the planetary transmission and the output shaft is coupled to a second part (37) of the planetary transmission, with the respective one gear stage (3, 5) establishing a direct connection of the drive shaft (11) of the transmission unit to the output shaft (15) and the respective other gear stage (2, 4, 6) establishing an indirect connection of the drive shaft (11) to the output shaft (15) via a third part (39) of the planetary transmission—or vice versa.

* * * * *